(12) United States Patent
Okamura et al.

(10) Patent No.: US 6,408,652 B1
(45) Date of Patent: *Jun. 25, 2002

(54) SOLUTION DOPING METHOD OF MAKING AN OPTICAL AMPLIFYING FIBER

(75) Inventors: Koji Okamura; Keiko Takeda, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 09/299,666

(22) Filed: Apr. 27, 1999

Related U.S. Application Data

(62) Division of application No. 08/868,397, filed on Jun. 3, 1997.

(30) Foreign Application Priority Data

Dec. 27, 1996 (JP) .............................. 8-350156

(51) Int. Cl.$^7$ ........................................... C03B 37/027
(52) U.S. Cl. .............................. 65/390; 65/399; 65/417
(58) Field of Search .......................... 65/417, 390, 399

(56) References Cited

U.S. PATENT DOCUMENTS

| | | | |
|---|---|---|---|
| 4,815,079 A | | 3/1989 | Snitzer et al. |
| 4,830,463 A | * | 5/1989 | Lemaire |
| 5,058,976 A | * | 10/1991 | DiGiovanni ................. 65/390 |
| 5,278,850 A | | 1/1994 | Ainslie et al. |
| 5,284,500 A | * | 2/1994 | Okamura ..................... 65/390 |
| 5,411,565 A | * | 5/1995 | Cognolato ................... 65/390 |
| 5,530,710 A | | 6/1996 | Grubb |
| 5,702,497 A | * | 12/1997 | Oh |
| 5,961,682 A | * | 10/1999 | Lee ............................. 65/390 |

FOREIGN PATENT DOCUMENTS

| | | |
|---|---|---|
| EP | 0 451 293 A | 10/1991 |
| EP | 0 469 795 A | 2/1992 |
| JP | 5-119222 | 5/1993 |

OTHER PUBLICATIONS

Patent Abstracts of Japan, vol. 015, No. 196, May 21, 1991 and JP 03 048225 A (Furukawa Electric Co. Ltd.), Mar. 1, 1991.
Patent Abstracts of Japan, vol. 017, No. 320, Jun. 17, 1993 and JP 05 034528 A (Fujikura Ltd.), Feb. 12, 1993.
Patent Abstracts of Japan, vol. 016, No. 313, Jul. 9, 1992 and JP 04 088306 A (Furukawa Electric Co. Ltd.), Mar. 23, 1992.
Patent Abstracts of Japan, vol. 012, No. 210, Jun. 16, 1988 and JP 63 008707 A (Fujikura Ltd), Jan. 14, 1988.

* cited by examiner

*Primary Examiner*—John Hoffmann
(74) *Attorney, Agent, or Firm*—Staas & Halsey LLP

(57) ABSTRACT

An optical amplifying fiber including a clad, a first core provided inside the clad and containing Ge, a second core provided inside the first core and containing Er and Al, and a third core provided inside the second core and containing Ge. The second core has a refractive index higher than that of the clad, and the first and third cores have refractive indexes each of which is higher than that of the second core. Since the third core having the high refractive index is provided at a central portion, it is possible to make smaller a mode field diameter and hence to improve a conversion efficiency of pumping light into signal light. Further, since the second core contains Al as an amplification band width increasing element, it is possible to sufficiently ensure a wide amplification band width.

7 Claims, 8 Drawing Sheets

SOLUTION DOPING METHOD OF MAKING AN OPTICAL AMPLIFYING FIBER

This application is a divisional of application Ser. No. 08/868,397, filed Jun. 3, 1997, now allowed.

BACKGROUND OF THE INVENTION

1. Field of the Invention

The present invention relates to an optical fiber applicable to an optical fiber amplifier and a process of producing the optical fiber.

2. Description of the Related Art

An optical amplifier capable of directly amplifying light signals without conversion into electric signals is advantageous in that it can be easily enlarged in capacity because of a substantially bit rate free function thereof and that it can collectively amplify multiple channels, and from this standpoint, it is being extensively studied as one of key devices of future optical communication systems by various research organizations.

There is known one form of an optical amplifier using a single mode optical fiber including a core doped with a rare earth element such as Er, Nd, or Yb (hereinafter, referred to as "a doped fiber"), wherein signal light to be amplified is transmitted to the doped fiber and at the same time pumping light is introduced into the doped fiber in the direction identical or reversed to that of the signal light.

The optical amplifier using the doped fiber, which is called an optical fiber amplifier, has excellent features of eliminating a polarization dependency of a gain, lowering a noise, reducing a loss in coupling with an optical transmission path, and the like. In practical use of the optical fiber amplifier of this type, it is required to make wider a wavelength band width of signal light in which the signal light can be amplified at a specific gain (hereinafter, referred to simply as "a wavelength band width") and to make higher a conversion efficiency of pumping light into signal light.

As for light having a wavelength within a range of 0.8 to 1.6 $\mu$m, there have been established a technique of producing an optical fiber using a quartz glass suitable for long-distance transmission, and a technique of putting the optical fiber into practice. An optical fiber is obtained by drawing a preform in the shape of a thick rod. The preform is required to have a composition gradient in a cross-sectional direction thereof which is accurately set as designed.

A standard process of preparing a preform has been known, in which a glass composition chemically converted from reactive gases is deposited on an inner surface of a quartz reaction tube by a MCVD (Metal Chemical Vapor Deposition) process or the like. In the MCVD process, suitable reactive gases such as $SiCl_4$ and $O_2$ are introduced in the quartz reaction tube, and the quartz reaction tube is heated at a temperature suitable for reaction of the gases. A heating zone is moved in the longitudinal direction of the quartz reaction tube, to deposit a new glass layer on an inner wall surface of the quartz reaction tube. A plurality of layers, for example, 20–30 layers are repeatedly deposited. A composition gradient in the cross-sectional direction of an optical fiber produced from the preform can be controlled by independently adjusting compositions of the layers of the preform. After the layers are fully deposited, the quartz reaction tube is collapsed by heating, to be thus formed into a rod-shaped preform. The preform is then drawn to produce an optical fiber.

In the MCVD process, a reactive material vaporized at a room temperature is generally used. For example, $SiCl_4$ is used for forming $SiO_2$ which is a main component of an optical fiber, and $GeCl_4$ is used for forming $GeO_2$ which is an element for adjustment of a refractive index. Incidentally, for production of a doped fiber, a suitable reactive material containing a rare earth element sufficiently evaporated at a room temperature cannot be obtained, differently from $SiCl_4$ and $GeCl_4$, and consequently a rare earth element cannot be doped in the doped fiber at a practically sufficient concentration only by the MCVD process. For this reason, a rare earth element has been doped in a doped fiber at a practically sufficient concentration in the following manner.

A known process of preparing a preform suitable for production of a doped fiber includes a step (1) of depositing a soot-like core glass on an inner surface of a quartz reaction tube, a step (2) of allowing the soot-like core glass impregnated with a solution containing a rare earth element compound as a solute, and a step (3) of drying the solution and collapsing the quartz reaction tube. On the other hand, a technique of widening a wavelength band width of an optical fiber amplifier using a doped fiber has been proposed, in which a core is impregnated with $Al_2O_3$ as well as a rare earth element.

For example, Japanese Patent Laid-open No. Hei 5-119222 discloses a double core structure including an aluminum/silica based glass (Er-Al-$SiO_2$) doped with erbium (Er) and aluminum (Al), which is provided at a center portion of a core; and a germanium/silica based glass (Ge-$SiO_2$) doped with germanium (Ge), which is provided at an outer peripheral portion of the core. In the prior art structure disclosed in Japanese Patent Laid-open No. Hei 5-119222, however, is disadvantageous in that a relative index difference Δl of the core peripheral portion is about 2% but a relative index difference Δ2 of the core center portion is about 0.7% at the utmost, with a result that there occurs a large depression of a refractive index at the core central portion.

This is due to the fact that an element doped for widening a band width, such as Al, acts to decrease a refractive index. The depression of a refractive index causes a phenomenon in which a mode field of transmission light is spread and thereby a mode field diameter is made larger. The mode field diameter thus increased is inconvenient in converting pumping light into signal light and results in degradation of a conversion efficiency of pumping light into signal light. For example, in the prior art structure disclosed in Japanese Patent Laid-open No. Hei 5-119222, a mode field diameter was about 4.8 $\mu$m and a conversion efficiency of pumping light into signal light was 64%.

SUMMARY OF THE INVENTION

It is therefore an object of the present invention to provide an optical amplifying fiber capable of widening a wavelength band width, and improving a conversion efficiency of pumping light into signal light by suppressing a mode field diameter at a small value, and to provide a process of producing the optical amplifying fiber.

In accordance with an aspect of the present invention, there is provided an optical amplifying fiber including: a clad having a first refractive index; a first core, provided inside the clad, containing a refractive index increasing element and having a second refractive index higher than the first refractive index; a second core, provided inside the first core, containing a rare earth element and an amplification band width widening element and having a third refractive index higher than the first refractive index and lower than the second refractive index; and a third core, provided inside the second core, containing a refractive index increasing element and having a fourth refractive index higher than the third refractive index.

The refractive index increasing element may be selected from Ge and Ti. Of these elements, Ge is preferably used. The second core preferably contains Er and Al.

According to another aspect of the present invention, there is provided a process of producing an optical amplifying fiber, including the steps of: (a) forming a first core layer mainly made of $SiO_2$ doped with $GeO_2$ or $TiO_2$ on an inner surface of a quartz reaction tube by chemical vapor deposition; (b) forming a soot-like second core layer mainly made of $SiO_2$ on the first core layer by chemical vapor deposition; (c) allowing the second core layer impregnated with a solution containing a rare earth element and at least one element selected from a group consisting of Al, Zn, Sn and La; (d) evaporating a solvent of the solution impregnated in the second core layer; (e) heating the second core layer to vitrify the second core layer; (f) forming a third core layer mainly made of $SiO_2$ doped with $GeO_2$ or $TiO_2$ on the second core layer by chemical vapor deposition; (g) perfectly collapsing the quartz reaction tube by heating to form a preform; and (h) melting and spinning the preform.

In the optical amplifying fiber of the present invention, since the third core having a large relative index difference is provided at the core central portion, a light power is concentrated at the core central portion as compared with the doped fiber having the prior art structure, to make smaller a mode field diameter, thereby improving a conversion efficiency of pumping light into signal light.

Further, since the second core contains a rare earth element and an amplification band width widening element, it is possible to ensure a sufficient wide band width of an optical fiber amplifier. The amplification band width widening element may be selected from a group consisting of Al, Zn, Sn, and La.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
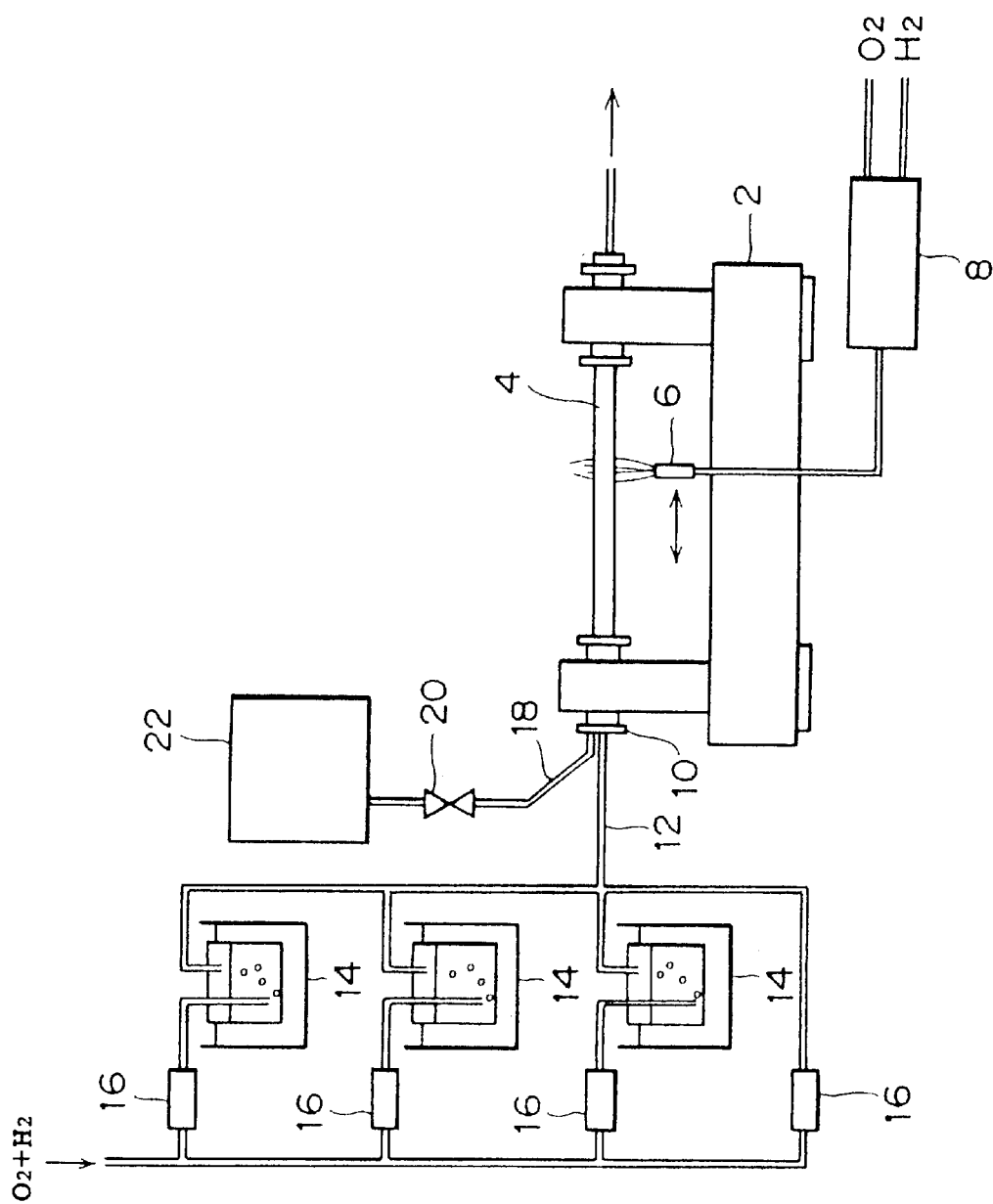
FIG. 1 is a schematic configuration view of a preform preparing apparatus.

Referring to FIG. 1, there is shown a schematic configuration of a preform preparing apparatus usable for preparation of a preform. Reference numeral 2 indicates a lathe for producing a glass rotatably supporting a quartz reaction tube 4; 6 is a burner reciprocated on the lathe 2 in the longitudinal direction of the quartz reaction tube 4 for heating the quartz reaction tube 4 from the outside thereof; and 8 is a temperature controller for controlling a burning state of the burner 6 by adjusting flow rates of $O_2$ and $H_2$ or the like fed to the burner 6.

A gas feed pipe 12 is connected to a connector 10 connected to an end portion of the quartz reaction tube 4, and source gases such as $SiCl_4$ and $O_2$ are fed into the quartz reaction tube 4 via the gas feed pipe 12. Reference numeral 14 indicates feeders for feeding source gases such as $SiCl_4$ and $GeCl_4$, and the feed amount of the source gases is controlled by a flow rate of a carrier gas such as $O_2$ fed via each mass flow meter 16.

A solution feed pipe 18 is connected to the connector 10 in parallel to the gas feed pipe 12, and is also connected to a solution tank 22 via a valve 20. A solution in the solution tank 22 is fed in the quartz reaction tube 4 when the valve 20 is opened. In addition, a connection portion at which the gas feed pipe 12 and the solution feed pipe 18 are connected to the quartz reaction tube 4 via the connector 10 is sealed by a known method, to thereby ensure a closed system in the quartz reaction tube 4.

FIGS. 2A to 2G are diagrams illustrating sequence steps of preparing a preform using the preform preparing apparatus shown in FIG. 1. First, a $P$-$F$-$SiO_2$ based clad glass (not shown) is preferably formed in the quartz reaction tube 4 having an outside diameter of 22 mm and an inside diameter of 18 mm by feeding source gases, $SiCi_4$, $POCl_3$, and $SF_6$ in the quartz reaction tube 4. The step of depositing the clad glass may be omitted.

Figure 2A:
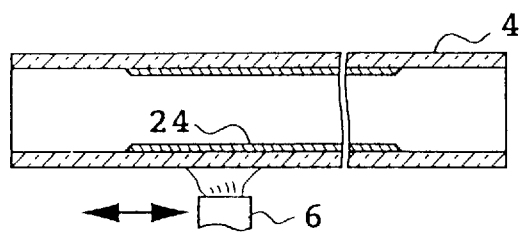
FIGS. 2A to 2G are diagrams illustrating sequence steps for preparing a preform according to an embodiment of the present invention.

Next, as shown in FIG. 2A, the quartz reaction tube 4 into which source gases including $SiCl_4$ and $GeCl_4$ and a carrier gas are being fed is rotated and simultaneously heated by the burner 6 from the outside thereof, so that a fine powder of an oxide glass taken as a first core is deposited in the quartz reaction tube 4. The fine powder is immediately vitrified by heating using the burner 6. By repeating the reciprocating motion of the burner 6 by a plurality of times, a first core layer 24 made of $SiO_2$ doped with $GeO_2$ and having a predetermined refractive index and a predetermined thickness is uniformly formed on an inner wall of the quartz reaction tube 4.

The refractive index of the first core layer 24 is set to be higher than the refractive index of the quartz reaction tube 4 for obtaining a predetermined relative index difference. The refractive index of the first core layer 24 can be adjusted by a composition of the source gases and the like. For example, the first core layer 24 has a relative index difference of about 2.0. Next, while not shown, the feed of the source gases is stopped and the quartz reaction tube 4 is heated at a high temperature by the burner 6, to be thus collapsed slightly. This is called an intermediate collapse treatment. After the feed of $GeCl_4$ of the source gases is stopped and the heating temperature of the quartz reaction tube 4 heated by the burner 6 is lowered, the quartz reaction tube 4 is heated at a lower temperature by the burner 6 from the outside thereof, to deposit a fine powder of an oxide glass made of $SiO_2$ on the first core layer 24.

Figure 2B:
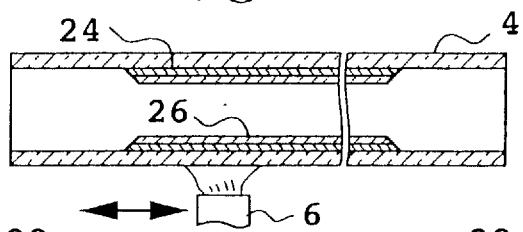
Figure 2C:
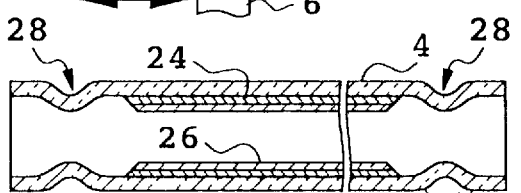

By repeating the reciprocating motion of the burner 6 by a plurality of times, a soot-like second core layer 26 made of $SiO_2$ is formed on the first core layer 24, as shown in FIG. 2B. Here, the wording "soot-like" means a fine powdery or porous state capable of keeping the form of a layer. The lowering of the heating temperature of the quartz reaction tube 4 heated by the burner 6 is to prevent the second core layer 26 from being immediately vitrified. After that, as shown in FIG. 2C, the burner 6 is moved to a position near an end portion of the quartz reaction tube 4, and in such a state, the quartz reaction tube 4 is locally heated while being rotated, to form a constricted portion 28 having a small diameter at the heated portion. The constricted portion 28 is formed at each end portion of the quartz reaction tube 4.

Figure 2D:
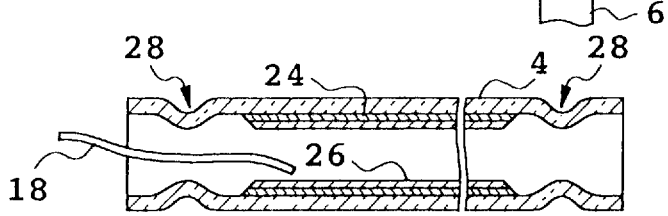

The quartz reaction tube 4 is cooled to a suitable temperature, and as shown in FIG. 2D, a solution feed pipe 18 made of a flexible resin or the like is introduced into the quartz reaction tube 4 with a leading end thereof positioned between the constricted portions 28, 28, and a solution fed from the solution tank 22 is injected in the quartz reaction tube 4 at a region between the constricted portions 28, 28. The solution thus injected in the quartz reaction tube 4 is impregnated only in the soot like second core layer 26. The solution to be fed in the quartz reaction tube 4 contains a rare earth element and Al. In this embodiment, the solution contains $ErCl_3.6H_2O$ and $AlCl_3$ as a solute in ethanol as a solvent.

The concentration of $ErCl_3.6H_2O$ in the solution is, for example, within a range of 0.001 to 1 wt %. The concentration of the solution for obtaining predetermined dope concentrations of $Al_2O_3$ and Er in an optical fiber or a preform can be experimentally determined. The injected amount of the solution is, for example, within a range of 5 to 20 ml. After the solution feed pipe 18 is retreated, dried $N_2$ gas is fed in the quartz reaction tube 4 to slowly evaporate alcohol and moisture, and the remaining moisture is sufficiently removed by feeding $Cl_2$ and $O_2$ in the quartz reaction tube 4 and heating the quartz reaction tube 4 by the burner 6.

Figure 2E:
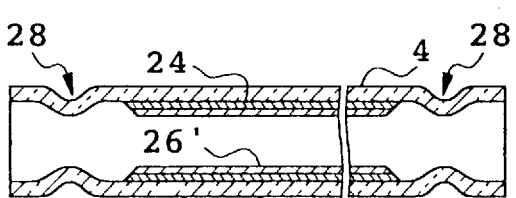
Figure 2F:
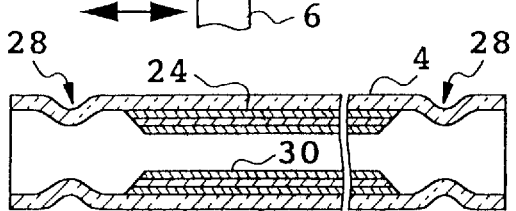

After that, as shown in FIG. 2E, by heating the quartz reaction tube 4 by reciprocating the burner 6, the soot-like second core layer 26 is vitrified, to thereby obtain a vitrified second core layer 26'. A relative index difference of the second core layer 26' is, for example, 0.7%. The quartz reaction tube 4 is then heated at a high temperature by the burner 6 to perform the intermediate collapse treatment again, and as shown in FIG. 2F, source gases containing $SiCl_4$ and $GeCl_4$ and a carrier gas are fed in the quartz reaction tube 4 and at the same time the quartz reaction tube 4 is heated by the burner 6 from the outside thereof as in the step shown in FIG. 2A.

Figure 2G:
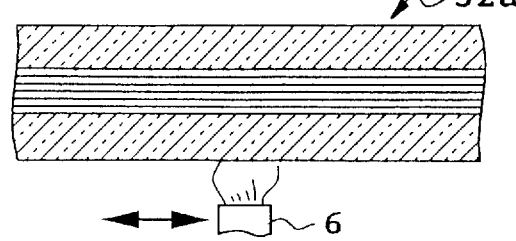

A fine powder of an oxide glass taken as a third core layer is deposited on the second core layer 26', and the fine powder is immediately vitrified by heating using the burner 4. By repeating the reciprocating motion of the burner 6 for a plurality of times, a third core layer 30 made of $SiO_2$ doped with $GeO_2$ and having a predetermined refractive index and a predetermined thickness is uniformly formed on the second core layer 26'. A relative index difference of the third core layer 30 is, for example, about 2.0%. Finally, as shown in FIG. 2G, the quartz reaction tube 4 is perfectly collapsed until a hollow portion thereof disappears by further heating the quartz reaction tube 4 at a higher temperature by the burner 6, to obtain a preform 32a. It is to be noted that the reason why the intermediate collapse treatment is performed after each of the steps shown in FIGS. 2A and 2E is to prevent diffusion of Ge, Al and the like between respective core layers as much as possible. A diameter of the preform 32a after the perfect collapse treatment is about 14 mm.

Figure 3A:
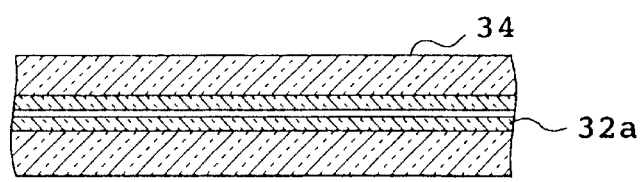
FIGS. 3A to 3D are diagrams illustrating sequence steps of drawing a covering tube.
Figure 3B:
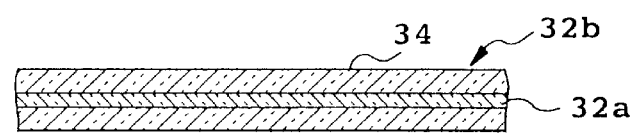
Figure 3C:
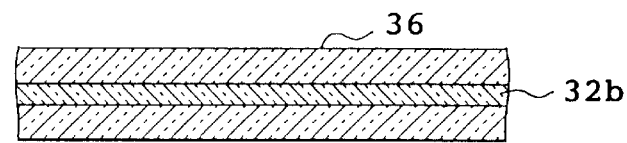

The preform 32a having a diameter of about 14 mm thus prepared is covered with a quartz glass tube 34 having an outside diameter of 22 mm as shown in FIG. 3A, and subsequently, as shown in FIG. 3B, it is integrated with the quartz glass tube 34 by heating, followed by drawing of the covering tube into a diameter of about 14 mm, to obtain a preform 32b. After the covering tube drawing step is repeated for a plurality of times, the preform 32b is finally covered with a thick quartz glass tube 36 having an outside diameter of about 26 mm as shown in FIG. 3C, followed by integration therewith by heating, to prepare a preform 32 having a diameter of about 14 mm as shown in FIG. 3D.

By repeating the covering tube drawing step for a plurality of times, it becomes possible to make smaller a relative core diameter and hence to optimize both a mode field diameter and a cut-off wavelength, and also to optimize the inside and outside diameters of the second core portion doped with Er and hence to improve a conversion efficiency. The second core 26' in this embodiment contains Al at a concentration of about 6 wt %, and Er at a concentration of about 500 ppm.

Figure 3D:
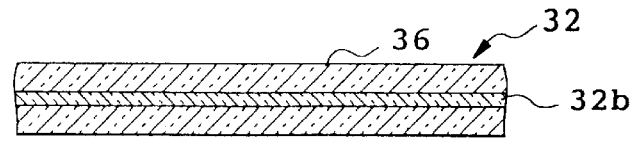
Figure 4A:
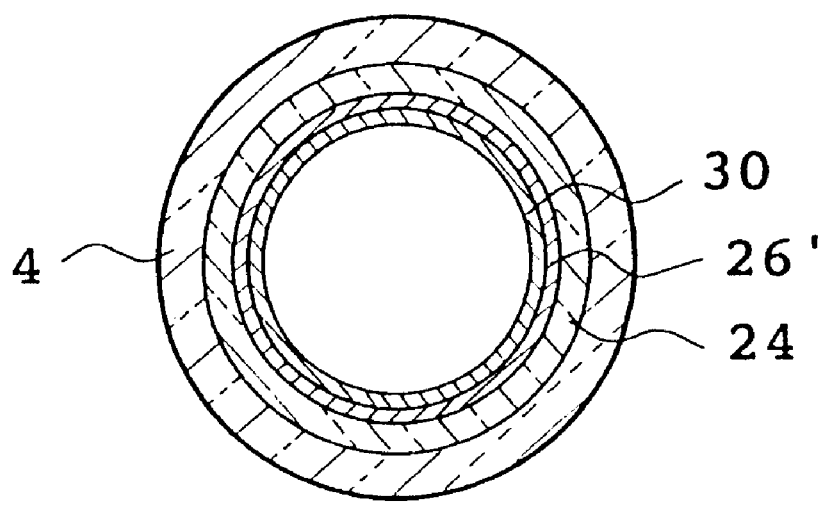
FIG. 4A is a transverse sectional view of a quartz reaction tube before collapse.
Figure 4B:
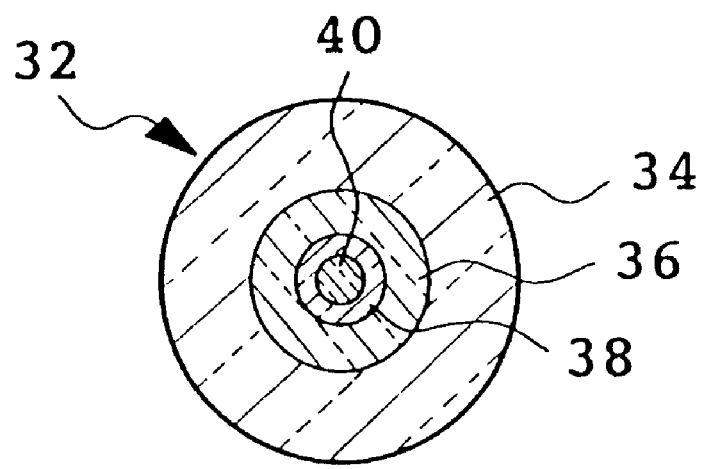
FIG. 4B is a transverse sectional view of a preform.

A transverse cross-section of the quartz reaction tube 4 before the perfect collapse treatment is shown in FIG. 4A, and a transverse cross-section of the preform 32 obtained by the step shown in FIG. 3D is shown in FIG. 4B. The preform 32 after the covering tube drawing step includes the clad 34 made of $SiO_2$ and having a relatively low refractive index, a first core 36 made of $SiO_2$ doped with $GeO_2$ for increasing a refractive index and having a relatively high refractive index, a second core 38 made of $SiO_2$ doped with Er and $Al_2O_3$ and not doped with $GeO_2$ and a third core 40 made of $SiO_2$, doped with $GeO_2$, for increasing a refractive index and having a relatively high refractive index.

The second core 38 has the refractive index higher than that of the clad 34, and the first and third cores 36, 40 have the refractive indexes each of which is higher than that of the second core 38. The main component $SiO_2$ of each portion may contain $P_2O_5$ or the like for adjusting a refractive index. An optical fiber obtained by drawing the preform 32 shown in FIG. 4B has a transverse cross-section analogous to that of the preform 32, and it also has each component having the same composition as that of the corresponding component of the preform 32. Therefore, each component of the optical fiber is indicated by the same name and reference numeral of the corresponding component of the preform 32.

According to the preform preparing process described in this embodiment, since the solution is injected between the constricted portions 28, 28 formed in the quartz reaction tube 4 and is impregnated in the second core layer 26, the quartz reaction tube 4 is not required to be removed from the lathe for impregnation of the solution. In this case, the injection of the solution between the constricted portions 28, 28 of the quartz reaction tube 4 can be performed from one side of the quartz reaction tube 4, so that it is possible to keep the closed system including the feed system for source gases. This prevents degradation of a loss characteristic by permeation of impurities in the quartz react-on tube 4. Further, according to the preform preparing process of this embodiment, since all of the steps of preparing a preform can be carried out in a state in which the quartz reaction tube 4 is mounted on the lathe 2, there can be eliminated laborious works of, for example, mounting/dismounting the quartz reaction tube 4 to/from the lathe 2.

Figure 5:
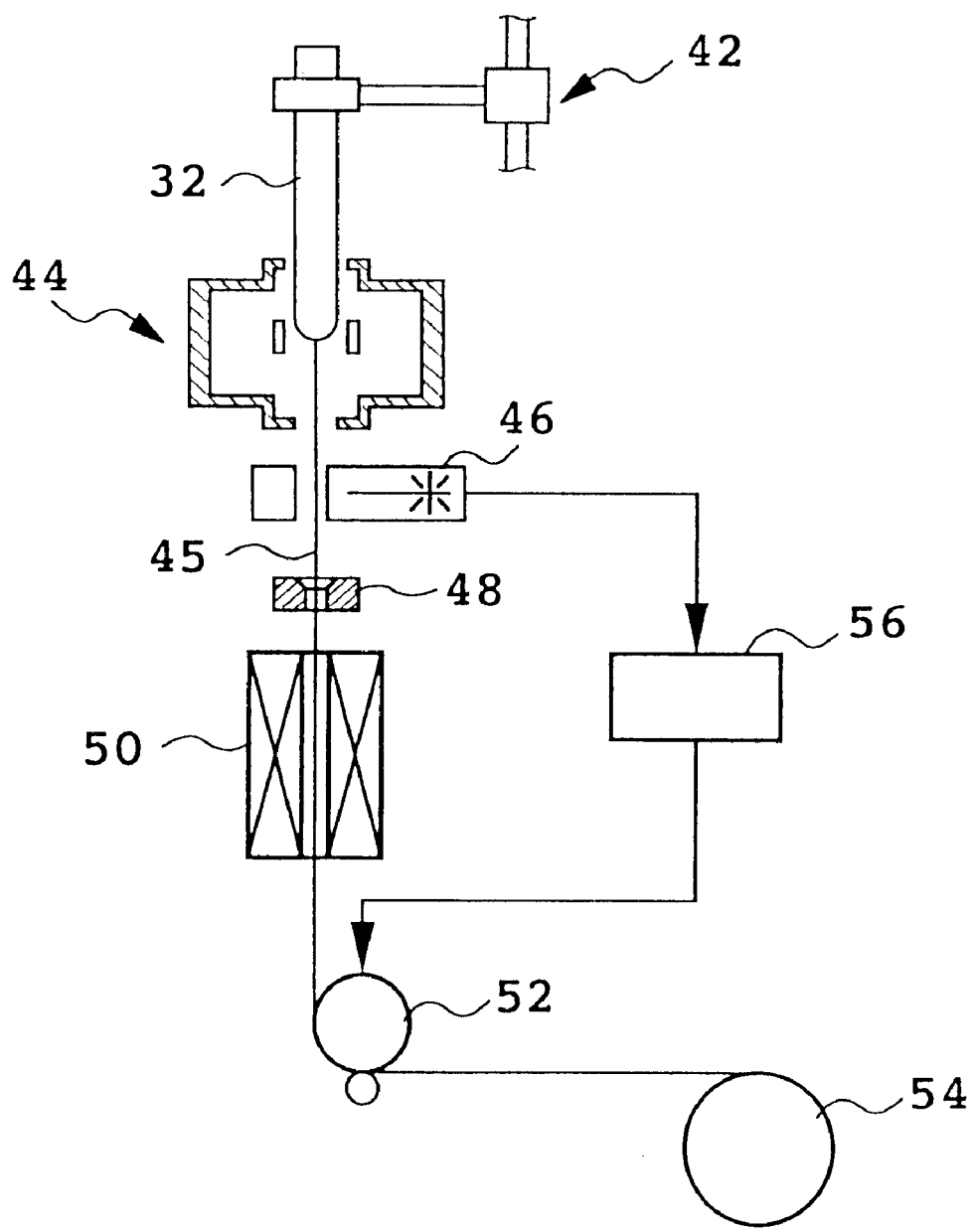
FIG. 5 is a schematic configuration view of an optical fiber drawing apparatus.

FIG. 5 is a schematic view of an apparatus for drawing a preform into an optical fiber. The preform 32 is supported by a preform feeding portion 42 and gradually fed downward, and a lower end of the preform 32 is heated to be melted in a heating furnace 44. The preform 32 is drawn into a doped fiber 45 at a lower end portion of the heating furnace 44, and a diameter of the doped fiber 45 is measured by a fiber diameter measuring unit 46 in a non-contact manner. The doped fiber 45 is then coated with a ultraviolet (UV) curing epoxy resin by a coating unit 48, followed by curing of the coating by a ultraviolet lamp 50. The doped fiber 45 coated with the UV curing epoxy resin is wound around a winding drum 54 via a capstan roller 52 rotating at a controlled speed.

The rotating speed of the capstan roller 52 is feedback-controlled by a fiber diameter control unit 56 for keeping constant a diameter of the doped fiber 45 measured by the fiber diameter measuring unit 46. The doped fiber 45 having stable characteristics in the longitudinal direction, such as, dope concentrations of a rare earth element and $Al_2O_3$ and a diameter of each component, can be produced from the preform 32 using such a drawing apparatus.

In accordance with the above-described production process, the doped fiber 45 having a triple core structure of the first, second, and third cores 36, 38, and 40 is produced. Specifically, the doped fiber 45 has the clad 34 made of $SiO_2$, the first core 36 made of $SiO_2$ doped with $GeO_2$, the second core made of $SiO_2$ doped with Er, $Al_2O_3$ and not doped with $GeO_2$, and the third core 40 made of $SiO_2$ doped with $GeO_2$.

Figure 6:
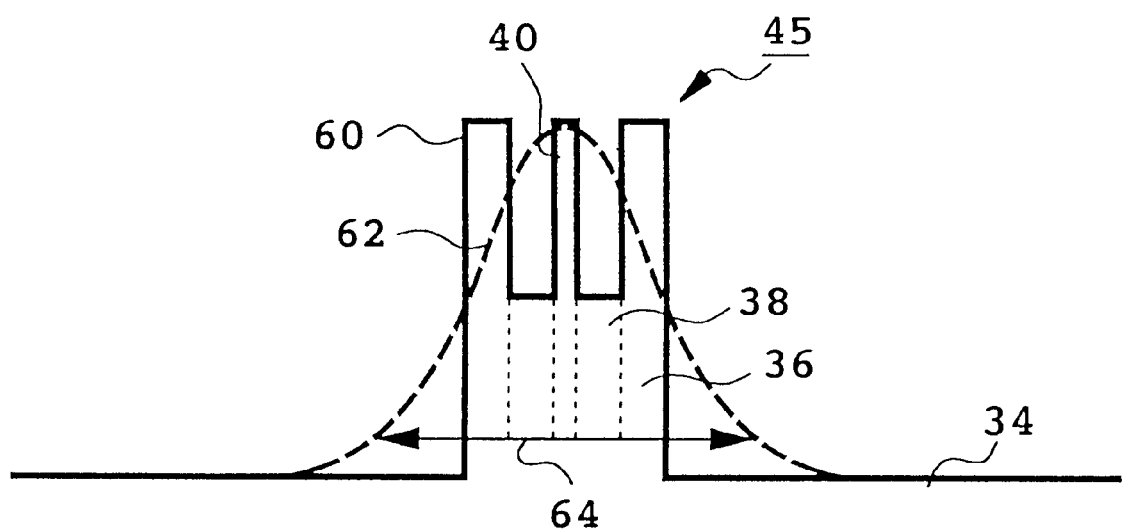
FIG. 6 is a diagram showing a refractive index profile and a mode field of the optical amplifying fiber according to the embodiment of the present invention.
Figure 7:
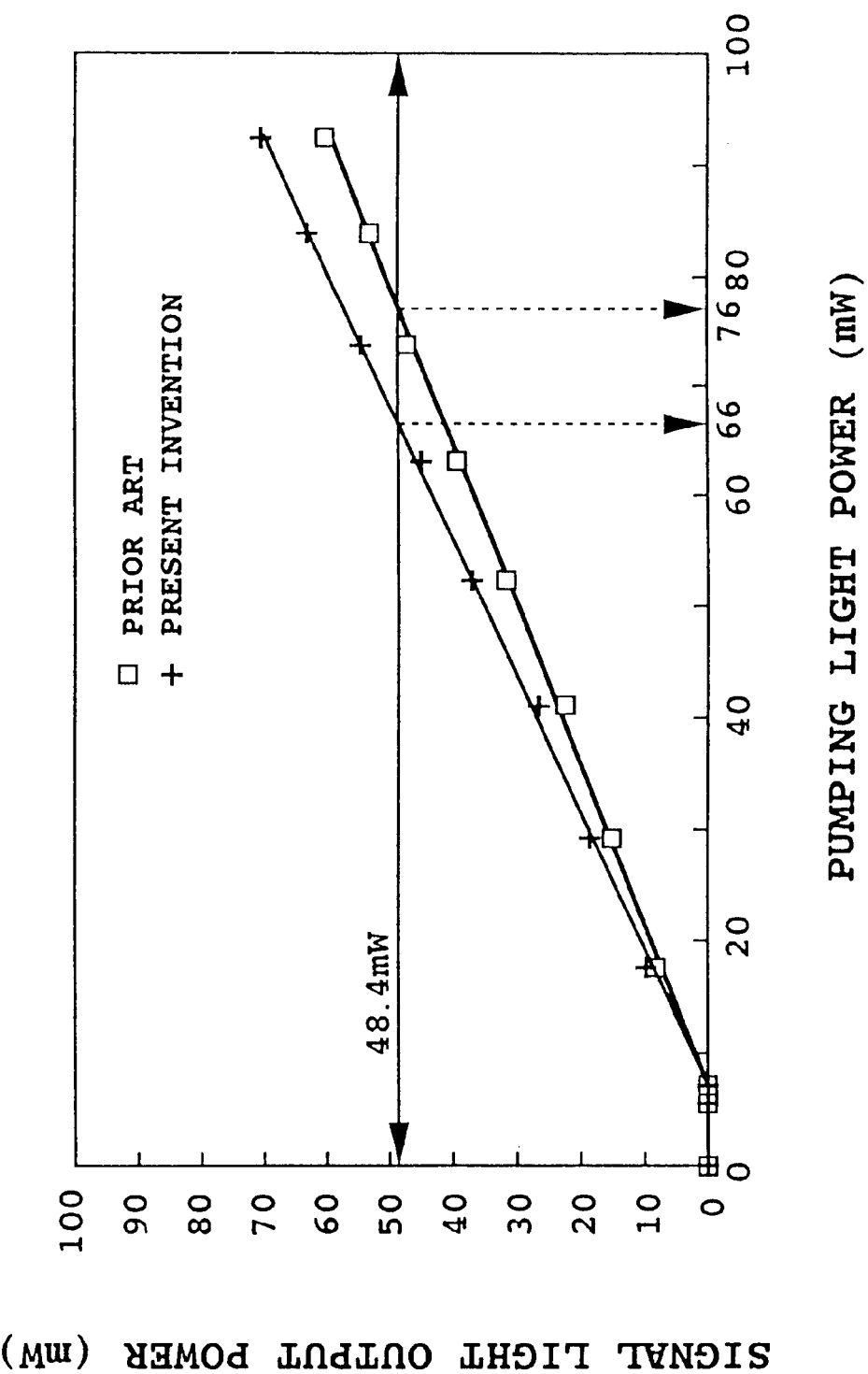
FIG. 7 is a diagram showing a relationship between a pumping light power and a signal light output.

FIG. 6 shows a refractive index profile 60 and a mode field 62 of the doped fiber 45 obtained in this embodiment. Letting D1, D2, and D3 be diameters of the first, second and third cores 36, 38 and 40 respectively, and $\Delta 1$, $\Delta 2$, and $\Delta 2$ be relative index differences of the first, second and third cores 36, 38 and 40 respectively, $\Delta 1$=about 2%, D1=about 3.0 μm, $\Delta 2$=about 0.7%, D2=about 0.8 μm, $\Delta 3$=about 2%, and D3=about 0.6 μm. Further, a mode field diameter 64 is 4.4 μm and a conversion efficiency of pumping light into signal light is about 73%. Results of an experiment made for examining conversion efficiency characteristics are compared with values of the prior art doped fiber disclosed in Japanese Patent Laid-open No Hei 5-119222 as shown in Table 1 and FIG. 7.

TABLE 1

| | structure loss | mode field diameter | efficiency gradient | threshold value | conversion efficiency |
|---|---|---|---|---|---|
| Prior art doped fiber | 20 dB/Km | 4.8 μm | 70% | 7.0 mW | 64% |
| Doped fiber of the invention | 7 dB/Km | 4.4 μm | 80% | 5.5 mW | 73% |

As is apparent from Table 1, for the doped fiber 45 of this embodiment, the mode field diameter is reduced from the value (4.8 μm) of the prior art doped fiber to 4.4 μm and the conversion efficiency is increased from the value (64%) of the prior art doped fiber to 73%. The threshold value in Table 1 means the minimum value of a pumping light power at which a gain of signal light is started to appear.

Figure 8:
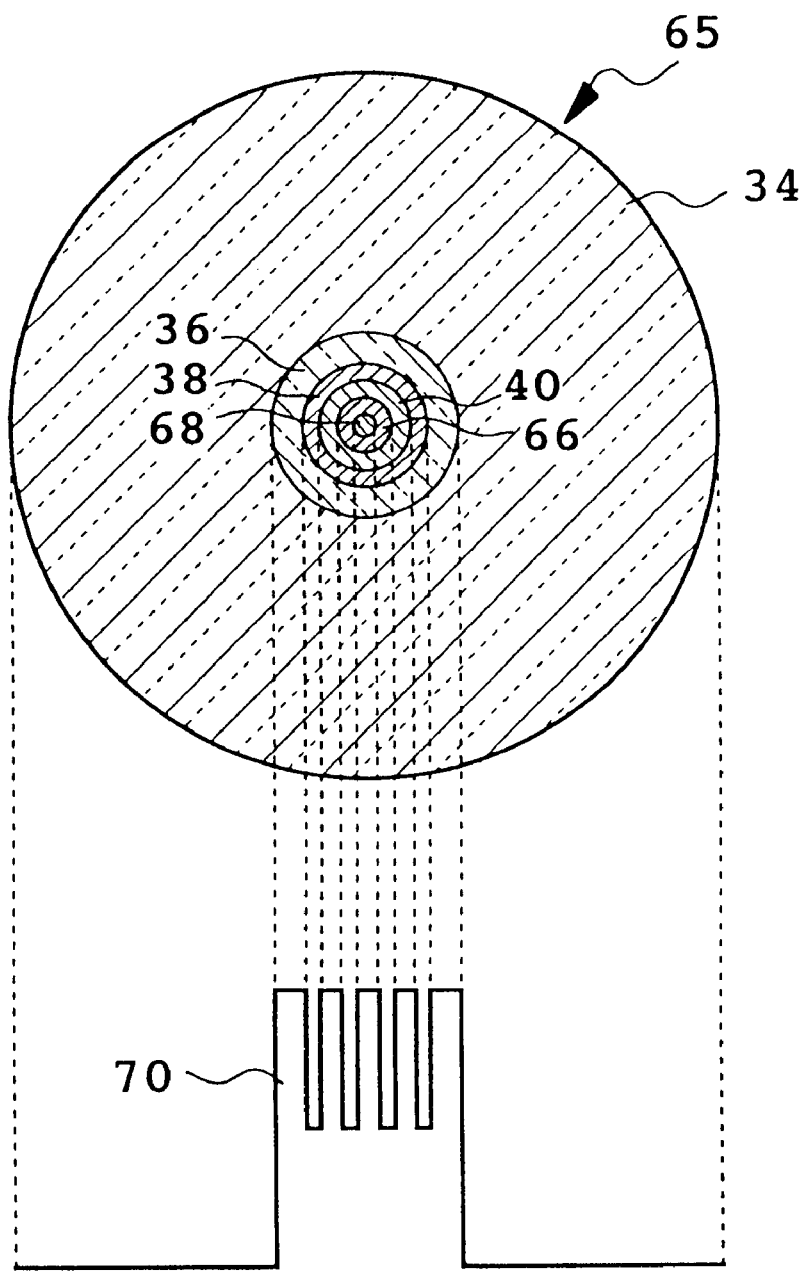
FIG. 8 is a view showing a sectional structure and a refractive index profile of an optical amplifying fiber according to another embodiment of the present invention.

Referring to FIG. 8, there is shown a sectional structure and a refractive index profile 70 of a doped fiber 64 produced according to another embodiment of the present invention. The doped fiber 65 of this embodiment has a configuration that a fourth core 66 and a fifth core 68 are provided inside the third core 40 of the doped fiber 45 of the first embodiment. The fourth core 66 is made of $SiO_2$ doped with Er, $Al_2O_3$ and not doped with $GeO_2$, and the fifth core 68 is made of $SiO_2$ doped with $GeO_2$.

A relative index difference of the fourth core 66 is about 0.7% and a relative index difference of the fifth core 68 is about 2%. In the doped fiber 65 of this embodiment, an outside diameter of the first core 36 positioned at the outermost periphery is preferably to be 2 μm or less.

Although Er is used as a rare earth element in the above-described embodiments, the present invention is not limited thereto, and for example, a different rare earth element such as Nd or Yb may be used. Further, $TiO_2$ may be used as a dopant for increasing a refractive index, and an element such as Zn, Sn or La can be used for widening a bad width in place of Al.

As described above, the present invention has a meritorious effect of providing an optical fiber suitable for realizing an optical fiber amplifier which is wider in wavelength band width and is higher in conversion efficiency of pumping light into signal light.

What is claimed is:
1. A process of producing an optical amplifying fiber, comprising the steps of in the following order:
  (a) forming a first core layer mainly made of $SiO_2$ doped with $GeO_2$ or $TiO_2$ on an inner surface of a quartz reaction tube by chemical vapor deposition, said first core layer having a first refractive index;
  (b) forming a soot-like second core layer mainly made of $SiO_2$ on said first core layer by chemical vapor deposition;
  (c) impregnating said second core layer with a solution containing a solvent, a rare earth element and at least one element selected from the group consisting of Al, Zn, Sn and La;
  (d) evaporating the solvent in the solution impregnated in said second core layer;
  (e) heating said second core layer to vitrify said second core layer, said second core layer having a second refractive index lower than the first refractive index;
  (f) forming a third core layer mainly made of $SiO_2$ doped with $GeO_2$ or $TiO_2$ on said second core layer by chemical vapor deposition, said third core layer having a third refractive index greater than the second refractive index;
  (g) substantially uniformly collapsing said quartz reaction tube by heating to form a preform; and
  (h) melting and spinning said preform to thereby produce an optical amplifying fiber having first, second and third cores having compositions and refractive indexes corresponding respectively to those of said first, second and third core layers such that the refractive index of the second core is lower than the refractive index of the first core and the refractive index of the third core is greater than the refractive index of the second core, said third core having an outer diameter of 1 μm or less and being the inner most core of said fiber, the concentration of said at least one element in said second core being 4 wt % or more.

2. A process of producing an optical amplifying fiber according to claim 1, wherein the solution impregnated in said second core layer contains Er and Al.

3. A process of producing an optical amplifying fiber according to claim 1, further comprising steps of:
  between steps (a) and (b), performing an intermediate collapse treatment on the quartz reaction tube by heating the quartz reaction tube to thereby make smaller an outside diameter of the quartz reaction tube; and
  between steps (e) and (f), performing an intermediate collapse treatment on the quartz reaction tube by heating the quartz reaction tube to thereby make smaller the outside diameter of the quartz reaction tube.

4. A process of producing an optical amplifying fiber according to claim 1, further comprising the steps of covering the preform collapsed in step (g) with a new quartz glass tube, integrating the preform with the new quartz glass tube by heating, and drawing the integrated preform with the quartz glass tube.

5. A process of producing an optical amplifying fiber according to claim 1, wherein the quartz reaction tube has a fourth refractive index, the first refractive index being greater than the fourth refractive index.

6. A process of producing an optical amplifying fiber according to claim 1, wherein the quartz reaction tube has end portions and an intermediate portion, and between steps (b) and (c), the end portions of the quartz reaction tube are constricted with respect to the intermediate portion.

7. A process of producing an optical amplifying fiber, comprising:

(a) forming a first core layer containing $SiO_2$ doped with $GeO_2$ or $TiO_2$ on an inner surface of a reaction tube, said first core layer having a first refractive index;

(b) forming a second core layer containing $SiO_2$ on said first core layer;

(c) impregnating said second core layer with a solution containing a solvent, a rare earth element and at least one element selected from the group consisting of Al, Zn, Sn and La;

(e) heating said second core layer to vitrify said second core layer, said second core layer having a second refractive index lower than the first refractive index;

(f) forming a third core layer containing $SiO_2$ doped with $GeO_2$ or $TiO_2$ on said second core layer, said third core layer having a third refractive index greater than the second refractive index;

(g) collapsing said reaction tube by heating to form a preform; and (h) melting and spinning said preform to thereby produce an optical amplifying fiber having first, second and third cores having compositions and refractive indexes corresponding respectively to those of said first, second and third core layers such that the refractive index of the second core is lower than the refractive index of the first core and the refractive index of the third core is greater than the refractive index of the second core, said third core having an outer diameter of 1 $\mu$m or less and being the inner most core of said fiber, the concentration of said at least one element in said second core being 4 wt % or more.

* * * * *